United States Patent

Ouska

[11] 3,865,231
[45] Feb. 11, 1975

[54] ROLLER BAND MECHANISM AND SUSPENSION SYSTEM FOR OSCILLATING CONVEYORS

[75] Inventor: Ralph Charles Ouska, Hinsdale, Ill.

[73] Assignee: FMC Corp., San Jose, Calif.

[22] Filed: Jan. 28, 1974

[21] Appl. No.: 437,457

[52] U.S. Cl. ............ 198/220 CA, 74/89.2, 267/8 R
[51] Int. Cl. ............................................ B65g 27/00
[58] Field of Search... 198/220 A, 220 BA, 220 CA, 198/220 CB; 267/8 R; 74/89.2

[56] References Cited
UNITED STATES PATENTS

| | | | |
|---|---|---|---|
| 736,753 | 8/1903 | Marcus | 198/220 CA |
| 1,655,578 | 1/1928 | Stebbins | 198/220 CA |
| 2,657,789 | 11/1953 | Somogyi | 198/220 CA |
| 3,347,352 | 10/1967 | Gwinn | 198/220 CA |

Primary Examiner—Evon C. Blunk
Assistant Examiner—Joseph E. Valenza
Attorney, Agent, or Firm—J. F. Verhoeven; C. E. Tripp

[57] ABSTRACT

A roller band mechanism, having two equal diameter rollers and two flexible bands operating in rolling contact on opposite sides of an inclined plane with one end of each flexible band connected to the inclined plane member and the other end connected to one of a pair of parallel horizontal members, is disclosed for suspending an oscillating conveyor trough and/or a counterbalancing weight for an oscillating conveyor so that the suspended member or members moves along a predetermined inclined path when oscillated.

34 Claims, 15 Drawing Figures

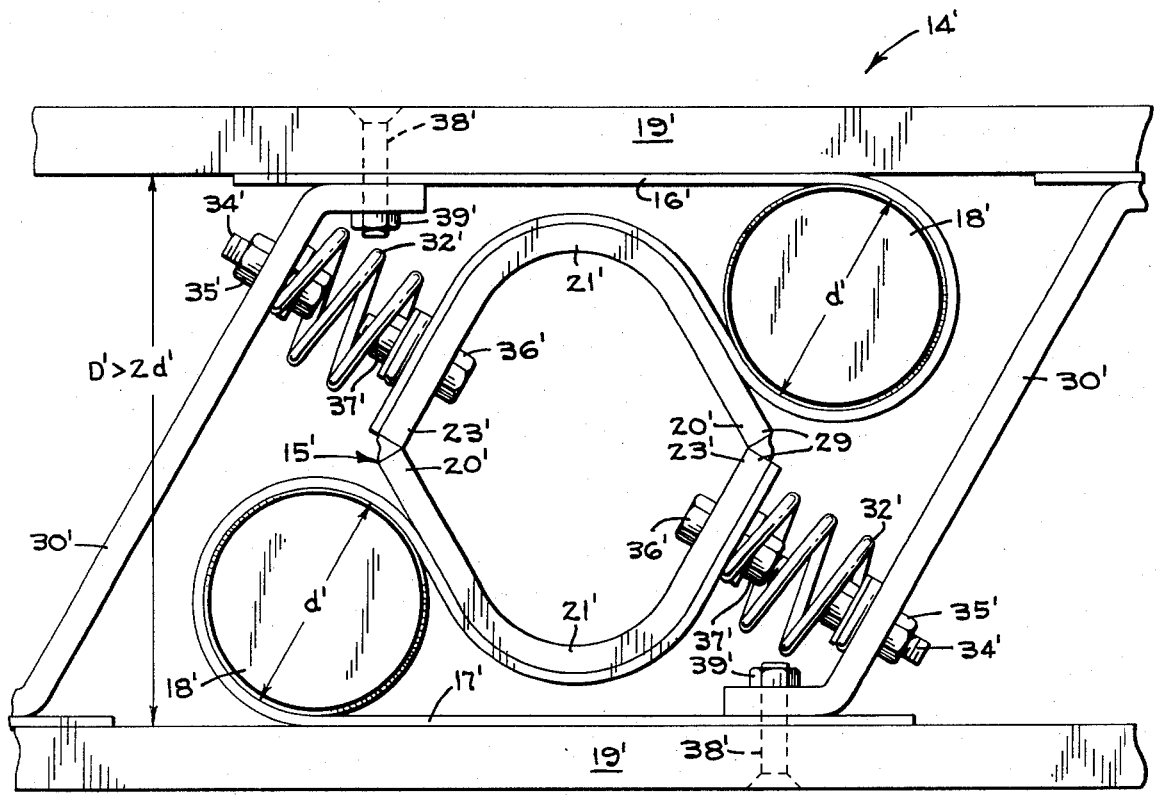
FIG_1A

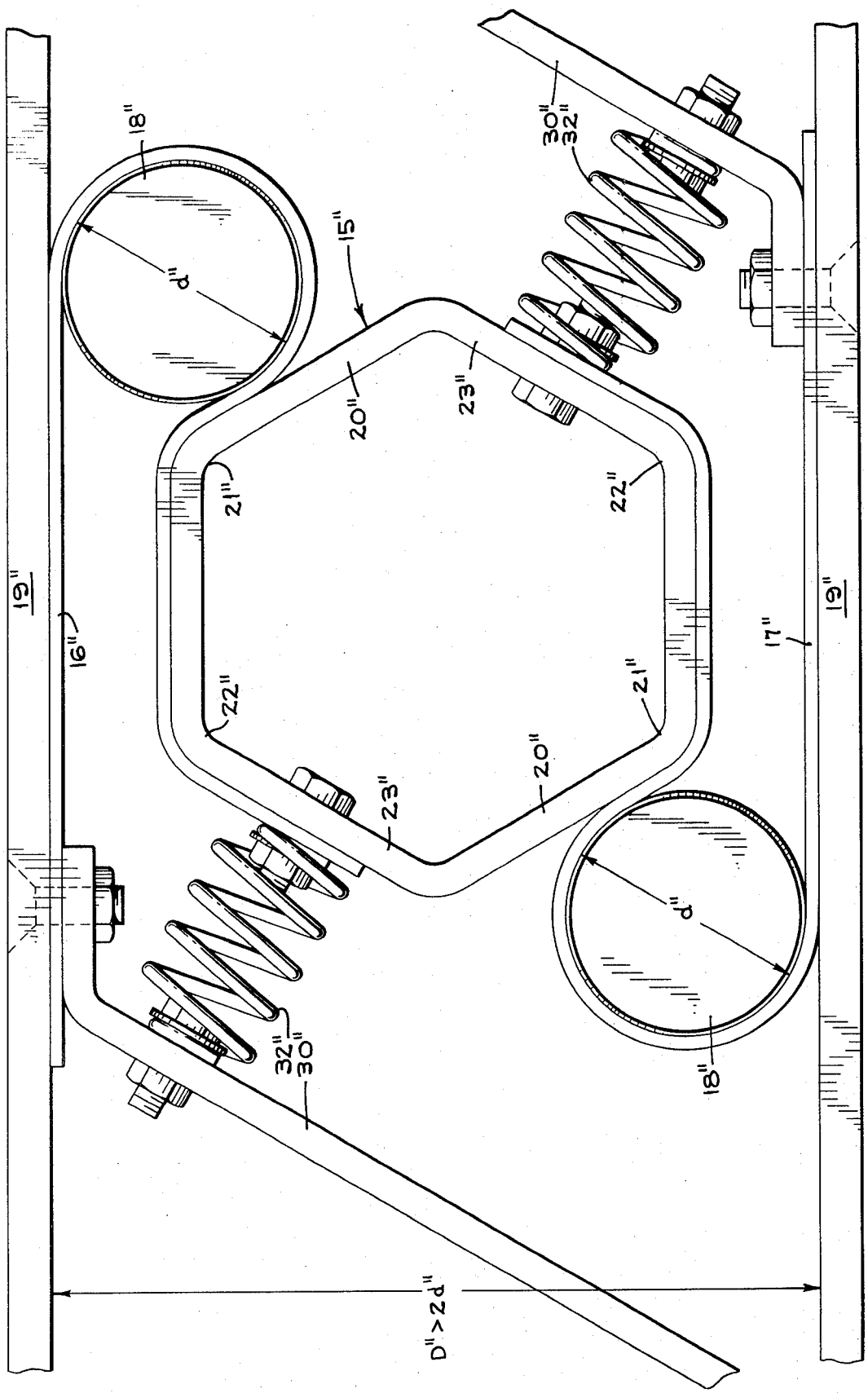

FIG_2
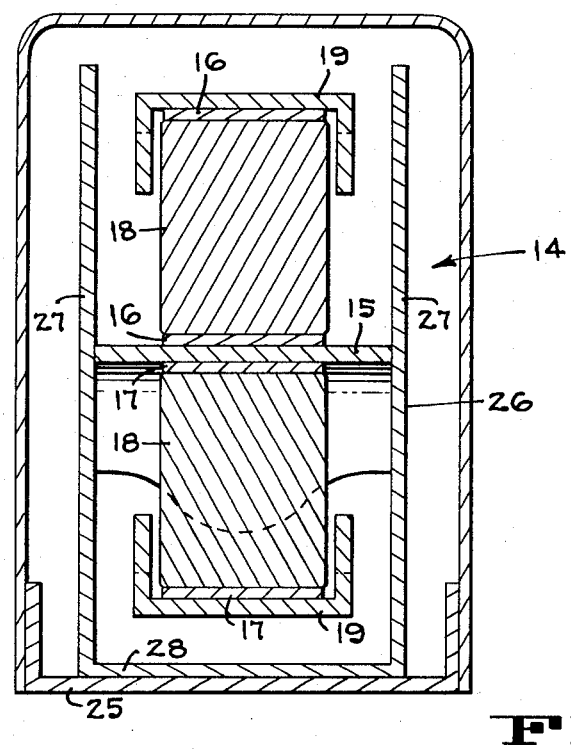
FIG_3A
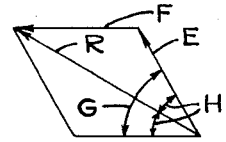
FIG_3
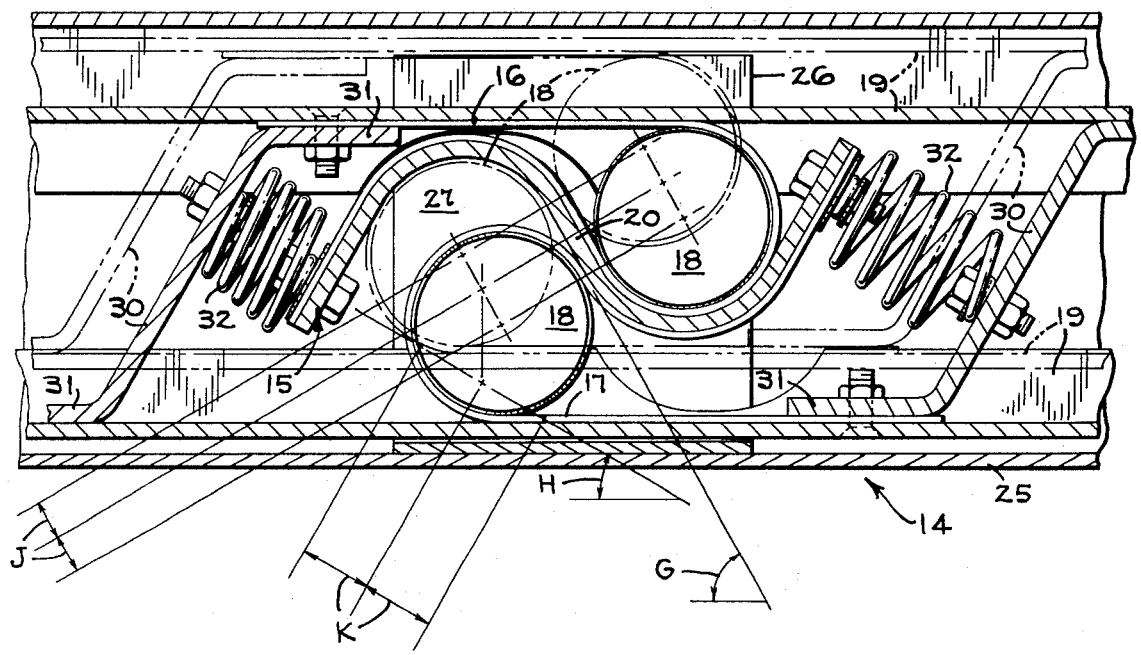

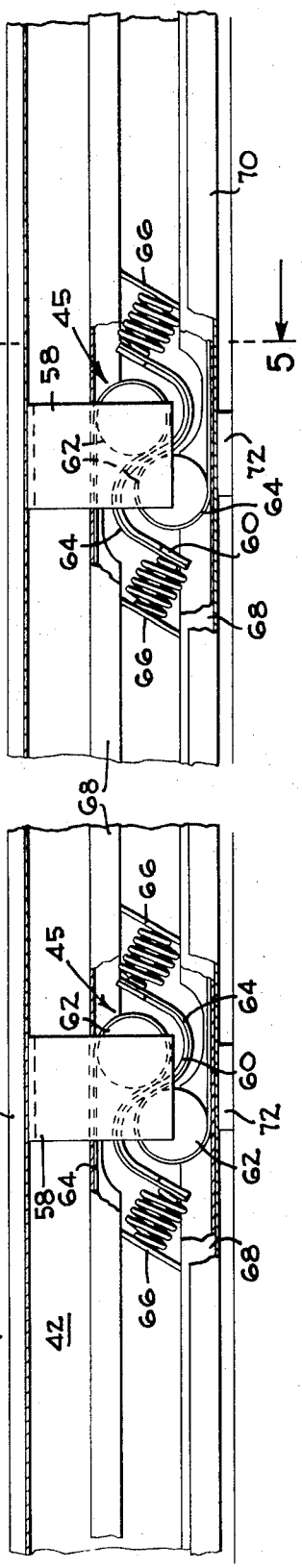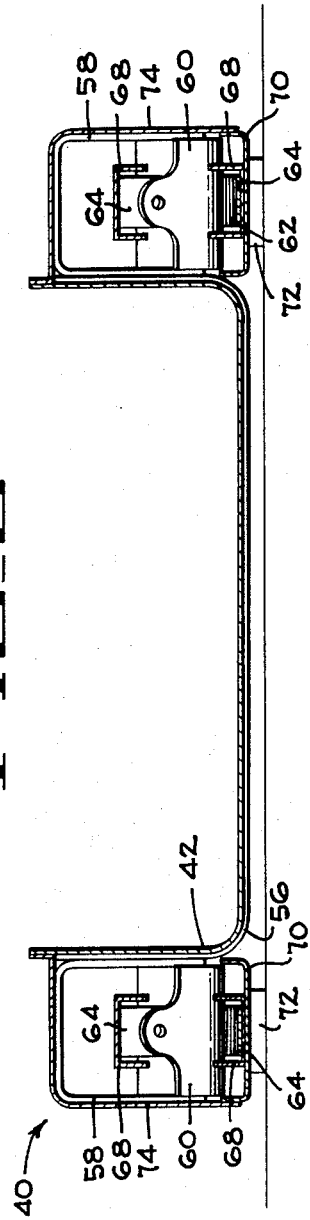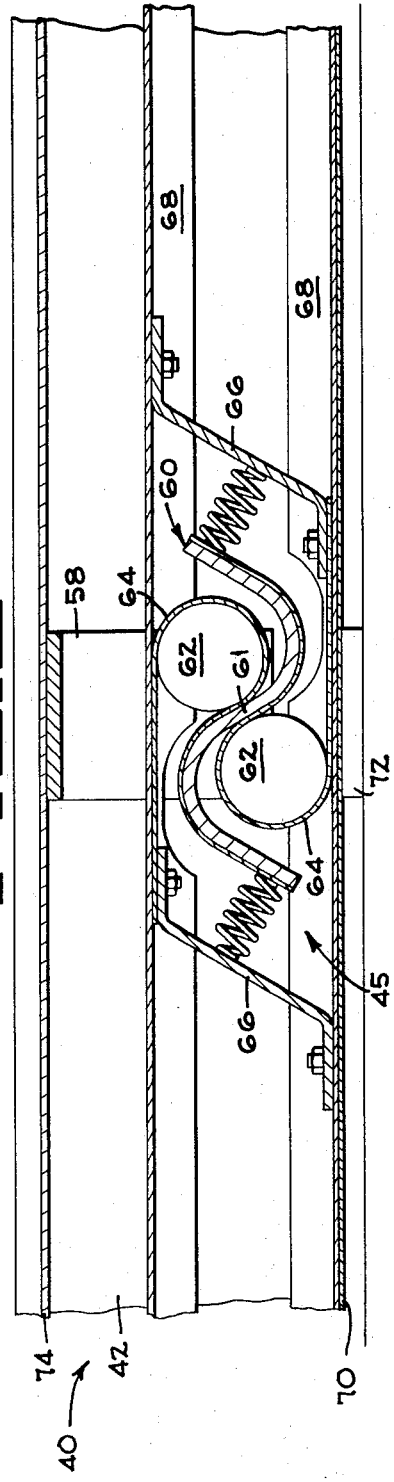

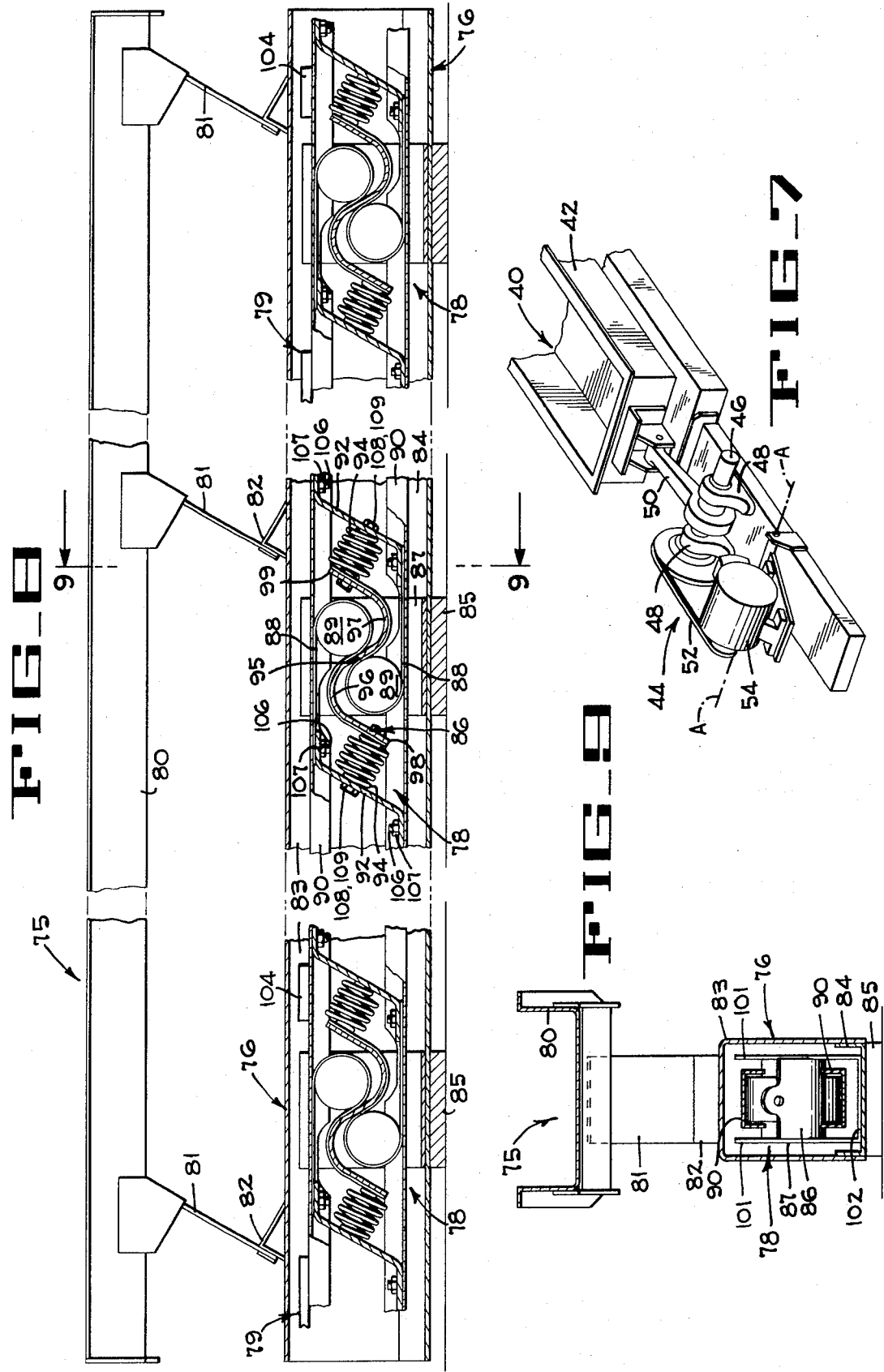

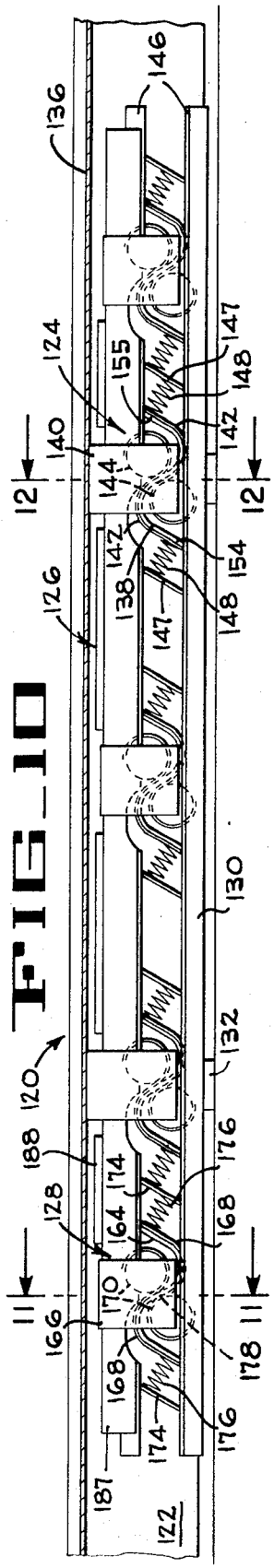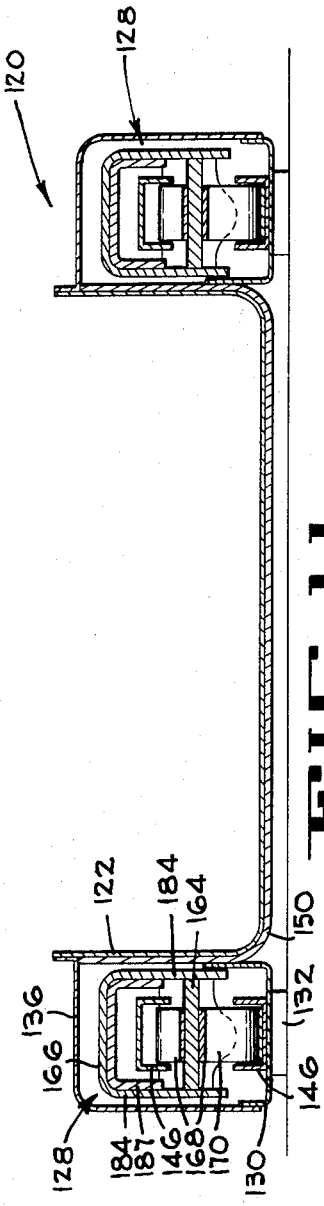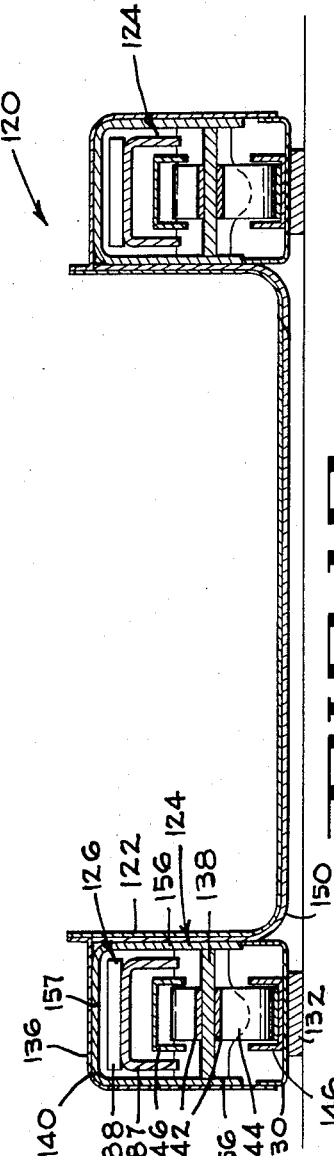

ROLLER BAND MECHANISM AND SUSPENSION SYSTEM FOR OSCILLATING CONVEYORS

BACKGROUND OF THE INVENTION

1. Field of the Invention

This invention relates to roller band mechanisms comprising a pair of flexible bands each connected at one end to an inclined plane member and at the other end to one of a pair of parallel horizontal members and having the bands partially wrapped around a pair of equal diameter rollers. These rollers are in simultaneous rolling contact through their bands with the inclined plane member and the pair of parallel members. When the mechanism is excited, as by a vibratory force, the inclined plane member or the pair of parallel members, depending upon which member is held stationary, will vibrate or oscillate in a resultant path inclined from the horizontal and different from the angle of the inclined plane member. A plurality of these roller band mechanisms are shown as providing suspension systems for supporting an oscillating trough or a counterbalancing weight for oscillating or vibrating conveyors, feeders and similar equipment.

Roller band devices using a single flexible band wrapped around two rollers operating in a guideway with walls separated from each less than the sum of the diameters of the rollers are disclosed by D. F. WILKES in U.S. Pat. Nos. 3,452,175, 3,452,309, 3,471,668 and 3,572,141. Additional roller band devices are shown in U.S. Pat. No. 3,592,069 to T. R. WELCH for a Roller-Ribbon Mechanical Motion; U.S. Pat. No. 3,605,546 to P. A. KLANN for a Roller Valve Device; U.S. Pat. No. 3,651,878 to G. A. COOLEY for a ROLOMITE Scale Construction; U.S. Pat. No. 3,710,631 to D. E. GLADOW for a Rotary Motion Apparatus; U.S. Pat. No. 3,730,007 to C. K. WELLINGTON for a ROLAMITE; and U.S. Pat. No. 3,739,648 to M. W. PAYST for a Roller Band Reciprocating Drive Mechanism.

Vibratory systems for machines are shown by U.S. Pat. No. 2,629,770 to D. O. SPROULE for a Vibration Transmitting System; U.S. Pat. No. 3,347,352 to J. T. GWINN JR. for a Vibratory Feeder and the Like; U.S. Pat. No. 3,356,331 to F. M. SPRINGUEL for a Shock Absorber; and U.S. Pat. No. 3,447,671 to H. SCHWEINFURTH for a Vibratory Work Machine with Shakeproof Support.

A Mechanical Oscillator is disclosed in U.S. Pat. No. 3,546,925 to M. V. BARTON which uses thin metal tapes attached to a roller in such a way that the roller will roll up on one tape and unroll from the other tape creating a restoring torque acting to return the roller to center.

SUMMARY OF THE INVENTION

In the present roller band mechanism one end of each band of a pair of flexible bands is attached to one surface of a pair of spaced parallel horizontal members and the other end is attached to an inclined plane member with an "S" configuration placed between the two parallel members so that the bands form loops and the inclined plane member joins the loops. Two equal diameter rollers are placed within the loops of the bands so that the surfaces of the spaced parallel members, the bands, the rollers and an inclined plane portion of the inclined plane member are in simultaneous contact when the bands are tensioned. A pair of reactor springs is positioned between the inclined plane member and the parallel members to hold the inclined plane member in equilibrium midway between the parallel surfaces. The rollers simultaneously traverse the inclined plane portion of the inclined plane member while traversing parallel surfaces of the two parallel members. The resulting motion causes the inclined plane member to move along an inclined or diagonal path with respect to the parallel surfaces, or inversely, allows the two parallel members to move horizontally and vertically along an inclined or diagonal path depending upon whether the inclined plane member or the pair of parallel members is held stationary. The driving force can be a positive drive, an unbalanced revolving weight or the two parallel members may be self-excited by being on a common support with another vibrating or oscillating conveyor. The inclined plane member is commonly rigidly attached at its transverse ends to a yoke member which is then connected to the member which oscillates in the diagonal path or is attached to a base frame which holds the inclined plane member stationary as the parallel members oscillate in the diagonal path.

A plurality of these roller band mechanisms may be used to provide a suspension system for directly supporting a trough of an oscillating conveyor without requiring the conventional trough supporting legs. When driven, the trough will then be oscillated along a particular inclined path when the inclined plane member is connected to the trough and at least one of the pair of parallel members is rigidly connected to a stationary base frame.

A plurality of these roller band mechanisms may also be used to provide a suspension system for directly supporting a balancer weight used for providing the kinetic forces opposing the unbalanced kinetic forces of an oscillating conveyor trough. When a conventional oscillating conveyor, driven by its own drive unit connected to the trough, is directly connected to and supported by a base frame containing the balancer weight, the balancer weight will be self-excited to oscillate in a diagonal path to provide the opposing kinetic forces. A plurality of roller band mechanisms are mounted within the base frame in such a manner that the balancer weight is directly attached to at least one of the pair of parallel members and the inclined plane member is rigidly connected through a yoke member to the stationary base frame. The parallel members with the attached balancer weight then are self-excited to oscillate in a diagonal path in an out-of-phase relationship balancing the motion of the conveyor trough while the inclined plane member is stationary.

The trough suspension system and the balancer weight suspension system may be incorporated in the same oscillating conveyor by alternately spacing each type of roller band mechanism and suitably positioning the balancer weight within the yoke member connected to the trough, in the trough suspension system, so that each suspension system may operate independently and without interference from each other. In this condition, the trough roller band mechanism is the same as previously described. However, the balancer weight suspension system is modified from that previously described. The yoke member, attached at the transverse ends of the inclined plane member for the balancer mechanism, is rigidly connected directly to the balancer weight and not to one of the pair of parallel members as previously described. The parallel members may then be common to both types of suspension systems and one of the parallel members is attached to the base members thus holding these members stationary. The inclined plane member for the balancer suspension will then be free to oscillate in a diagonal path similarly to the inclined plane member of the trough suspension system. Since the balancer weight is a separate member from the parallel members with operating space clear of the parallel members and the trough, the balancer weight is free to oscillate in a diagonal path in an out-of-phase relationship with the motion of the conveyor trough so as to balance the kinetic forces of the oscillating trough.

BRIEF DESCRIPTION OF THE DRAWINGS

FIG. 1A is an elevational view, partly in section, showing a first alternate construction of the inclined plane member.

FIG. 1B is an elevational view, partly in section, showing a second alternate construction of the inclined plane member.

FIG. 2 is a sectional view taken along line 2—2 of FIG. 1.

FIG. 3 is an elevational view of the roller band mechanism of FIG. 1 showing the two extreme positions of the rollers and the inclined path of motion of the parallel members as defined by the rolling of the rollers on the inclined plane where confined by the two flexible bands.

FIG. 3A is a vector diagram of the motion of the parallel members shown in FIG. 3.

FIG. 4 is an elevational view of an oscillating conveyor with its reciprocating trough supported by the roller band mechanism of the invention.

FIG. 5 is a sectional view taken along line 5-5 of FIG. 4.

FIG. 6 is an enlarged elevational view of the roller band suspension system of FIG. 4, partly in section.

FIG. 7 is a perspective view of a typical positive drive unit for an oscillating conveyor.

FIG. 8 is an elevational view of an oscillating conveyor equipped with a counterweight type balancer suspended on the roller band mechanism.

FIG. 9 is a sectional view taken along 9—9 of FIG. 8.

FIG. 10 is an elevational view of an oscillating conveyor equipped with both a roller band suspension system for the oscillating trough and a roller band suspension for a counterweight type balancer.

FIG. 11 is a sectional view taken along line 11—11 of FIG. 10 showing the balancer suspension system.

FIG. 12 is a sectional view taken along line 12—12 of FIG. 10 showing the trough suspension system.

DESCRIPTION OF THE PREFERRED EMBODIMENTS

Figure 1:
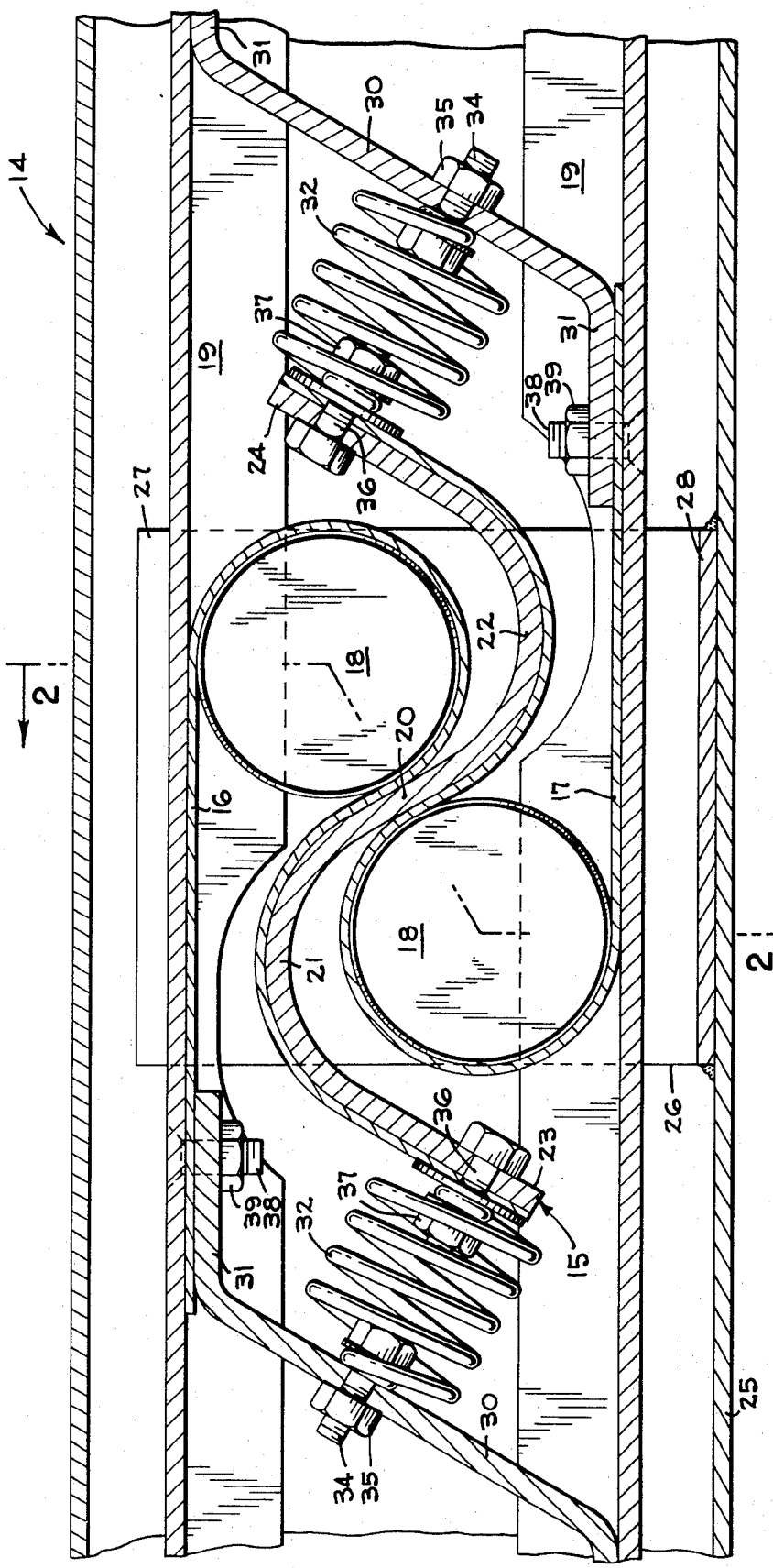
FIG. 1 is an elevational view, partly in section, of the roller band mechanism of the invention.

In oscillating or vibrating conveyors and feeders a pan or trough for carrying a load of bulk material has generally been supported on slightly inclined legs which are pivotally or flexurally connected to a stationary base along Reactor members in the form of coil springs, flexure plates, torsion bars or similar devices are also provided between the pan and the stationary base frame to fully or partially balance the inertia forces so the trough operates at or near its natural frequency. When the trough is driven, as by a rotating eccentric shaft operatively connected to the trough by a connecting rod, the trough by a connecting rod, the trough is moved up and down along an inclined plane approximately normal to the angle of the inclined legs. Material carried by the trough is then alternately lifted alaong this inclined plane and when the trough reverses its direction and lowers, the material tends to keep moving in a forward direction returning to the trough in an advanced position where it is again picked up in the next cycle and carried forward. Balancing devices are also occasionally required, where the foundation or supports for the stationary base frame is not structurally strong and rigid, in order to substantially eliminate the transfer of vibrating forces into the foundation or supports that might cause problems with the building structure in which the unit is operating. In the present disclosure a novel roller band mechanism and a suspension system, using a plurality of these novel roller band mechanisms which is particularly adapted to vibratory conveying equipment, are shown.

The roller band devices shown by D. F. WILKES in U.S. Pat. Nos. 3,452,175; 3,572,141; 3,452,309 and 3,471,668 comprise two equal diameter rollers, one flexible band of uniform thickness and width and a member having two parallel internal surfaces. The rollers are held together in a free rolling cluster by the single flexible band under tension which is partially wrapped around the rollers in an S configuration. The ends of the flexible bands are fastened to the opposite parallel internal surfaces of the member. The mechanism allows the rollers to move freely back and forth along the parallel surfaces they are contacting in a direction parallel to the parallel surfaces. These parallel surfaces must thus be spaced apart a distance less than the sum of the diameter of the two rollers and the thickness of the flexible band.

The basic roller band mechanism 14, as shown in FIGS. 1 and 2 of the present application, is a modular assembly which comprises an inclined plane member 15, an upper flexible band 16, a lower flexible band 17, a pair of equal diameter rollers 18, a pair of vertically spaced parallel members 19, a yoke or connection member 26, a pair of support members 30, and a pair of reactor springs 32. The inclined plane member 15 includes a central straight inclined plane portion 20 having two opposite parallel surfaces joined at each end by curved portions 21 and 22, and then followed by tangent straight end portions 23 and 24, which are usually formed at right angles to the axis of the reactor springs 32. A base frame 25 encloses the roller band mechanism and forms a support member between the roller band mechanism and the foundation. The inclined plane member 15 is rigidly connected at its transverse side edges to the yoke member 26 having two vertical legs 27 connected by a horizontal flange 28. The yoke or connection member 26 provides means for connecting the inclined plane member 15 to a conveyor trough or to the base frame as may be desired by the type of suspension system required and which will be discussed more fully later. There will always be an element which is a stationary member, usually attached to the conveyor base frame or incorporated in the base frame, and another element which is a movable member usually arranged to receive or to be connected to a load. In the case of vibratory conveying equipment, the load may be the conveyor trough for carrying the conveyed bulk material or a conveyor balancer having a movable balancing mass to counterbalance the kinetic forces of the vibrating trough.

In some instances it may be found convenient to attach the inclined plane member 15 to a single vertical plate and cantilever the inclined plane member from this vertical plate in lieu of using the yoke member 26. The flexible bands 16 and 17 are tension members and may be made of any material having some tensile strength yet having little or no lineal stretch under the expected tensions. A thin (0.005–0.010 inch) flexible strip of tempered carbon spring steel has proved satisfactory in operation. Flat rubber belting with fabric or metal reinforcement plies to substantially eliminate lineal stretch while retaining flexibility is another suitable band material. The bands, as used, have further been of constant thickness and width. The rollers 18 are cylindrical in shape with a length slightly greater than the width of the bands and may be solid or tubular, the latter offering the advantage of less inertia. The pair of parallel members 19 may be elongated structural steel channels positioned horizontally and supported by the pair of Z-shaped bent plate support members 30 located at longitudinally spaced intervals or a single member having two spaced parallel surfaces. When a plurality of roller band mechanisms are used together to form a suspension system, the parallel members 19 are usually continuous and interconnect the plurality of roller band mechanisms. The Z-shaped support members 30 further include top and bottom flanges 31 connected to the horizontally parallel members 19. The parallel members 19, as shown in FIG. 1, are vertically separated a distance less than the sum of the diameters of the two rollers 18, the thicknesses of the two flexible bands 16 and 17, and the thickness of the inclined plane portion 20 of the inclined plane member 15.

It should be pointed out here that while a single thickness of relatively thin plate for the inclined plane portion 20 is shown in FIG. 1, this thickness may be increased substantially to a relatively thick section or may be in the form of two separate parallel inclined plates with a substantial distance separating the two plates. In the latter case, the distance between the two parallel members 19 may then substantially exceed the sum of the diameters of the two rollers plus the thicknesses of the bands and the inclined plates. Alternate constructions are illustrated in FIGS. 1A and 1B and will be described more fully later. The operation of this mechanism is thus not restricted to the two parallel members 19 being spaced apart vertically a distance less than the sum of the diameters of the two rollers and the thickness of the flexible bands.

Reactor springs 32 are positioned between the Z-shaped members 30 and the end portions 23 or 24 of the inclined plane member 15 to hold the inclined plane member 15 in equilibrium, at rest, approximately midway between the parallel members 19. A spring seat for the reactor spring is provided on support member 30 approximately midway between the horizontal flanges 31. The first reactor spring 32 is retained at one end by a bolt 34, passing through the spring seat portion of member 30 and is secured by a nut 35. The other end of the first reactor spring is retained by a bolt 36 passing through end portion 23 of the inclined member 15 and is secured by a nut 37. The second reactor spring 32 is retained similarly to the first reactor spring between end portion 24 of the inclined member 15 and a second support member 30. One end of the upper flexible band 16 is secured under the first reactor spring on the end portion 23 of inclined plane member 15 where it is held by bolt 36 and nut 37 also retaining the reactor spring. The upper band is wrapped around the upper surface of inclined plane member 15, partially around the upper roller of the pair of rollers 18, and then along one surface of the upper one of the pair of parallel members 19. The other end of band 16 is then tensioned as it is secured between the upper flange 31 and the upper one of the parallel members 19 by bolt 38 and nut 39. One end of the lower flexible band 17 is secured under the second reactor spring 32 on the end portion 24 of the inclined plane member 15 where it it held by bolt 36 and nut 37 also retaining the second reactor spring. The lower band is wrapped around the loweor surface of inclined plane member 15, partially around the lower roller of the pair of rollers 18 and then along the lower surface of the lower one of the pair of parallel members 19. The other end of band 17 is then tensioned as it is secured between the lower flange 31 and the lower one of the pair of parallel members 19 by bolt 38 and nut 39.

When the rollers 18 are placed within the flexible bands 16 and 17 and the bands are tensioned, the upper one of the rollers is thus trapped in the loop of the upper flexible band 16 and the lower one of the rollers is trapped in the loop of the lower flexible band 17. The rollers are free, however, to roll within the bands up and down the central straight inclined plane portion 20 of the inclined plane member 15. At least one point on each roller is also in simultaneous tangential contact through its band with corresponding opposite surfaces of the spaced apart parallel members 19. The length of the straight inclined plane portion 20 of member 15 is selected to provide slightly more than the desired movement of either the parallel members 19 or the inclined plane member 15, depending upon the type of suspension system being used. Since the rollers roll on the inclined plane portion 20 through their bands and the parallel members 19 move linerally on another peripheral point of the rolling rollers through their bands and to which they are attahced, the resulting motion of the parallel members 19, when the inclined plane member 15 is held stationary, is in a diagonal direction and is increased over that of the roller itself on the inclined plane member.

In the inversion of the roller band mechanism shown in FIG. 1–2, the pair of parallel members is held stationary and the inclined plane member and the yoke member are movable being interconnected to the movable trough as shown in FIGS. 5–6 and thus the mechanism supports the trough so it moves in a resultant diagonal direction.

In the first alternate construction as shown in FIG. 1a, inclined plane member 15' comprises two formed plates 29 welded together into a modified four sided diamond shaped box. Each formed plate includes two straight legs 20' and 23' connected by a curved portion 21'. One of the legs 20' corresponds to the straight inclined plane portion 20 of the basic inclined plane member 15 and provides the surface on which the roller rolls. The second leg 23' corresponds to the tangent end portions 23 and 24 of the basic inclined plane member 15 and provides a surface for seating the reactor springs 32'. The curved portion 21' corresponds to the curved portions 21 and 22 of the basic inclined plane member 15. When the two formed plates 29 are welded together at the ends of legs 20' and 23' and assembled in the roller band mechanism 14', the legs 20' are inclined at the desired angle to the horizontal and are now parallel to each other but are spaced apart a given distance. The legs 23' are inclined, in a different direction, but are also parallel to each other. The angle of legs 23' is generally normal to the resulting direction of motion of the conveyor trough, so the centerline of the reactor springs is in substantial alignment with the resulting direction of motion of the conveyor trough in mid-position to eliminate lateral bending of the springs. The assembly of the flexible bands 16' and 17' on the new inclined plane member 15', the partial envelopment of the rollers 18' by the bands and their cooperative action are essentially as previously described for the basic roller band mechanism. It is to be noted that the vertical spacing D' of the parallel members is now increased and may be substantially greater than twice the roller diameter d'.

In the second alternate construction, as shown in FIG. 1B, the cross-section of the inclined plane member 15'' is in the form of a hexagonally shaped box with its corner having a radius. Two opposite sides 20'' of the hexagon correspond to the straight inclined plane portion 20 of the basic inclined plane member 15 and provide the surfaces on which the rollers roll. Opposite sides 23'', adjacent to sides 20'', correspond to end portions 23 and 24 of the basic inclined plane member 15, and provide surfaces for seating the reactor springs 32'. The curved portions 21'' and 22'' correspond to the curved portions 21 and 22 of the basic inclined plane members 15. It will be noted that sides 20'' are inclined at the desired angle to the horizontal and are parallel to each other but are spaced apart a given distance. The sides 23'' are inclined in a different direction and are parallel to each other. The angle of sides 23' is generally normal to the resulting direction of motion of the conveyor trough so the centerline of the reactor springs 32'' is in substantial alignment with the resulting direction of motion to eliminate lateral bending of the springs. The assembly of the flexible bands 16'' and 17'' on the inclined plane member 15''', the partial envelopment of the rollers 18'' by the bands, and their cooperative action are essentially as previously described for the basic roller band mechanism 14. It is to be noted that the vertical spacing D'' of the parallel members is now increased and may be substantially greater than twice the roller diameter d''.

FIG. 3 shows an example of a balancer attached to the parallel members 19 with the inclined plane member 15 held stationary and the determination of the locus of movement of a centroid of the balancer from the two extreme positions of movement. When using 4-inch diameter rollers, band thicknesses of ⅛ inch, a thickness of the inclined plane portion 20 of ⅝ inch and an angle of inclination G of the inclined plane portion 20 of 60 degrees from the horizontal, the resulting angle H of the locus of movement of the centroid of the balancer is 30°. When the rollers move along the 60° inclined plane portion 20 a distance J of 7/8 inch either side of a center position, the centroid of the balancer, on the parallel members 19, would move a distance K of slightly over 1-½ inches either side of a center position along the 30° inclined path. The spacing of the parallel members 19 thus becomes a function of the angle and length of stroke of the drive of the conveyor which excited the balancer, the angle of the inclined plane portion 20 and its thickness, the thickness of the bands 16 and 17, and the diameter of the rollers 18. Sufficient clearance for the movement of the oscillating parts may then be provided.

The resulting motion is shown by a vector diagram, FIG. 3A, formed by a rhombus made up of two equal isosceles triangles each having two equal sides E and F. Side E represents the true direction and linear distance traveled by the roller 18 along the inclined plane portion 20 and side F represents the true linear displacement parallel to the parallel members 19. The resultant vector R closing the isosceles triangle formed represents the true direction and distance traveled by the parallel members 19. Side E is inclined from the horizontal by angle G, the angle of inclination of the inclined plane portion 20. It is to be noted that angle G is bisected by the resultant R, so the inclination of the resultant, angle H, is one half of the angle of inclination of the inclined plane portion 20. The resulting motion of a point in one of the parallel members 19 is therefore in a diagonal direction and the locus of movement of this point is a straight line inclined at an angle H equal to one half the angle G of inclination of the inclined plane portion 20.

The roller band mechanism thus described provides a simple mechanism which is practically frictionless, requires no lubrication and includes rolling elements that operate within the flexible bands without slip and without clearance which is very desirable to eliminate wear, noise and maintenance problems in vibratory equipment. Further the stroke of oscillation of either the trough or the balancer, as required by the type of service in which the mechanism is applied, may be large for the amount of space required by the installation. The latter is particularly important where the mechanism supports a conveyor balancer since the stroke of the balancer may then be greater than the stroke of the trough and its connected drive. Thus, the mass of the balancer may be less than would otherwise be required with a stroke equal to the trough stroke since the products of the stroke and mass must be approximately equal for most effective balancing and elimination of any substantial transfer of vibratory forces to the supporting structure. In the conventional oscillating conveyor supported on inclined legs, the length of the legs has to be increased to obtain any significant increase in the length of stroke and this, in turn, increases the height of the conveyor and the space required. This mechanism allows the rollers to traverse an inclined surface while simultaneously traversing two parallel surfaces thus causing the inclined surface to move along a diagonal path with respect to the parallel surfaces when the latter are stationary or, inversely, allows the two parallel surfaces to move horizontally and vertically along a diagonal path when the inclined surface is held stationary. This is accomplished in a very compact low profile arrangement of the elements involved requiring minimum space.

It should be emphasized that the mechanism 14 shown and described herein comprises two flexible bands 16 and 17, two equal diameter rollers 18, a pair of vertically spaced horizontally parallel members 19 and an inclined plane member 15 having a central straight inclined portion 20 located between each set of the flexible bands and the rollers. The introduction of the inclined plane member 15 provides the desired diagonal movement of either one of two elements, the inclined plane member or the pair of parallel members, when the other member is held stationary. This diagonal movement produces a resulting direction of motion different from the horizontal and at an angle which may be selected to be the same as the resulting motion of the conveyor due to the angle of support of the trough and the angle of the connecting rod of the drive driving the conveyor trough. This is particularly useful in the application of the mechanism on oscillating conveyors or feeders which utilize the inclined motion of the trough to convey material in the trough.

A roller band suspension system for directly supporting a trough of an oscillating conveyor will now be described. FIGS. 4-7 illustrate an oscillating conveyor 40 having a trough 42 supported on a plurality of roller band mechanisms 45 without requiring the usual inclined leg assemblies. The trough 42 is an elongated U-shaped pan and is driven from one end by a drive unit 44 as shown in FIG. 7. This positive drive unit comprises a rotatable eccentric shaft 46 supported in a pair of anti-friction bearings 48 and a connecting rod 50 drivingly connected to the end of the trough. The eccentric shaft 46 is driven by a V-belt drive 52 from an electric motor 54. The motor 54 is pivotally mounted about axis A to tension the V-belt drive 52. Alternatively, an unbalanced revolving weight drive shaft mounted on the trough and rotated by a V-belt from an electric motor may be used to vibrate the trough. The trough as shown in FIGS. 4-6 is supported by a pair of roller band mechanism at each support location since one mechanism is attached to each upstanding flange of the trough, however, in the case of narrow troughs a single, centrally located roller band mechanism is generally adequate.

At each roller band mechanism location the trough 42 is reinforced by a U-shaped bent plate 56 rigidly attached to the trough as by welding. In each roller band mechanism 45 the yoke or connection member 58 is rigidly attached to and supports an inclined plane member 60 having a central straight inclined plane portion 61 with two opposite parallel surfaces. The yoke member is rigidly attached, as by welding, to the bent plate reinforcing member 56 on one of the upstanding vertical legs of the reinforcing member on each side of the trough. The inclined plane member 60 is therefore directly connected to and moves with the trough. A pair of rollers 62 is confined within loops of a pair of flexible bands 64 and roll on the bands over the straight inclined plane portion 61. Bent plate support members 66 are attached at each end to one of a pair of horizontal parallel members 68. The support members are spaced at longitudinal intervals to support the parallel members at a given vertical spacing. The parallel members are further positioned above and below the inclined plane member 60. Each of the flexible bands 64 is secured at one end to one of the parallel members 68 and is secured at the other end to the outer ends of the inclined plane member 60 with the intermediate portions partially wrapped around the roller and along the surfaces of the inclined plane member 60. The rollers 62 are located within loops of the flexible bands 64 and are free to roll within their bands on the central inclined plane portion 61 and the parallel members 68 also move linearly on the rollers, as previously described under the basic roller band mechanism 14 itself. The lower one of the parallel members 68 is attached to a base member 70 in the form of elongated channel shaped plate. At a central location under each roller band mechanism 45, the base member 70 further rests on resilient pads 72 which form a resilient support or vibration isolator between the conveyor and the ground or structure on which the conveyor is mounted. An elongated bent plate cover member 74 is attached to the upstanding leg of the trough 42, passes outside the yoke 58 and extends downwardly beyond the yoke to overlap the outer side of the base member 70. This cover thus moves with the trough 42 and is not connected to the stationary base member 70. The cover forms a safety guard enclosing the roller band mechanism. The trough 42 is thus movably supported by the inclined plane members 60 of the roller band mechanisms 45 and the parallel members 68 are stationary.

As particularly shown in FIG. 5 this suspension system provides a very low profile mounting for the trough of the oscillating conveyor and thus reduces the overall height previously required by conventional leg assemblies such as shown in FIG. 8. The roller band mechanism requires no lubrication, is practically frictionless and the rolling elements operate without clearance. Changes in stroke or angle of inclination of movement of the trough can be accommodated by the proper selection of the angle inclined portion 61, the diameter of the rollers 62 and the vertical spacing of the parallel members 68. Thus, the roller band suspension system is ideally suited for oscillating conveyor service where differences in the type of service of the conveyor or differences in the characteristics of the bulk material conveyed by the conveyor require changes in stroke or angle of motion to obtain the best results.

A roller band suspension system for a balancer of an oscillating conveyor will now be described. FIGS. 8 and 9 illustrate a conventional oscillating conveyor 75 mounted directly on a base frame 76 having a plurality of roller band mechanisms 78 supporting a balancer weight 79 to substantially eliminate the transfer of any vibratory forces into the foundation or supporting structure for the conveyor. The conventional oscillating conveyor 75 comprises a conveyor trough 80 supported on a plurality of spaced inclined legs 81 in the form of flexure plates. The bottom ends of legs 81 are secured directly through brackets 82 to the base frame 76 so the entire conventional conveyor 75 is supported on this base frame. The conveyor is driven by a positive drive operatively connected to the end of the conveyor trough. This drive is not shown on FIG. 8 but is similar to that illustrated in FIG. 7 and previously described. The base frame 76 encloses the plurality of roller band mechanisms 78 at longitudinally spaced intervals and is a continuous elongated box structure having an inverted U-shaped bent plate member 83 joined to a continuous bottom beam 84 which has isolation pads 85 at longitudinally spaced intervals supporting the base frame on the foundation or supporting structure for the conveyor.

Each of the roller band mechanisms 78 is identical so only one will be described. Each roller band mechanism 78 is a modular assembly which comprises an inclined plane member 86, a yoke or connection member 87, a pair of flexible bands 88, a pair of equal diameter rollers 89, a pair of vertically spaced parallel members 90, a pair of bent plate support members 92 for the parallel members, and a pair of reactor springs 94. The inclined plane member 86 includes a central straight inclined portion 95 having two opposite parallel surfaces, joined at each end by curved portions 96 and 97 and then followed by straight tangent end portions 98 and 99 which are generally formed at right angles to the central plane portion 95. The inclined plane member may also be constructed in the form of a pair of spaced parallel planes as shown in FIG. 1A and FIG. 1B and previously described. The yoke or connection member 87 includes a pair of vertical legs 101 joined at the bottom by a horizontal flange 102 as shown in FIG. 9. The inclined plane member 86 is rigidly connected as by welding at its transverse ends to the upstanding legs 101 of the yoke member. The horizontal flange 102 of the yoke member is rigidly secured as by welding to the bottom beam 84 of the base frame 76. Thus, the inclined plane member 86 is held stationary by its connection through the yoke member 87 to the bottom beam 84 of the base frame 76. The pair of parallel members 90 are usually elongated continuous beams, such as channels interconnecting several of the roller band mechanisms 78. Additional plates 104 are removably attached, between adjacent roller band mechanism, to provide additional weight when required or to adjust the overall balancing weight to better suit the operating conditions. The members 90 combined with the plate 104 comprise the balancer weight 79. The parallel members 90 are vertically separated and supported by the bent plate support members 92 so that one of the pair of the parallel members is above the inclined plane member 86 and the other parallel member is below. The vertical spacing of the parallel members 90 is a function of the angle of inclination of the inclined plane portion 95 and the diameter of the rollers 89. The bent plate support members 92 are attached at each end to one of the parallel members 90 by bolts 106 and nuts 107. The first and second reactor springs 94 are positioned between the support members 92 and the end portions 98 or 99 respectively of the inclined plane member 86 to hold the balance weight 79, comprising the parallel members 90 and the weight plates 104, in equilibrium when at rest approximately midway between the inside top of the member 83 and the inside of the bottom beam 84 of the base frame 76. The reactor springs are secured by bolts 108 and nuts 109.

One end of the upper one of the flexible bands 88 is secured under the first reactor spring 94 on the end portion 98 of inclined plane members 86 where it is held by bolt 108 and nut 109 also retaining the spring. The upper hand is wrapped around the upper surface of curved portion 96 of inclined plane member 86, partially around the upper roller of the pair of rollers 89 and then along the inside surface of the upper one of the pair of parallel members 90. The other end of the upper band is then tensioned as it is secured between the upper parallel member 90 and the upper end of the first of the pair of support members 92 by bolt 106 and nut 107. One end of the lower one of the flexible bands 88 is secured under the second reactor spring 94 on the end portion 99 of the inclined plane member 86 where it is held by bolt 108 and nut 109 also retaining the second reactor spring. The lower flexible band 88 is wrapped around the lower surface of the curved portion 97 of the inclined plane member 86, partially around the lower one of the pair of rollers 89 and then along the inside surface of the lower one of the parallel members 90. The other end of the lower band is then tensioned as it is secured between the lower parallel member 90 and the lower end of the second support member 92 by bolt 106 and nut 107. The pair of rollers 89 is thus confined within loops of the pair of flexible bands 88 but the rollers are free to roll on the bands over the straight inclined plane portion 95 of the stationary inclined plane member 86. The pair of parallel members 90, which with plates 104 form the balancer weight 79, move linearly on the rollers 89 giving a resulting motion to the balancer weight along a diagonal path as previously described under the basic roller band mechanism. It is to be noted that the conveyor trough 80 is power driven by the drive unit, but the balancer weight 79 is self-excited and has no power drive means of its own.

The natural frequency of the reactor springs 94 of the balancer system is selected to operate near but slightly above the operating frequency of the conveyor trough so that when starting, the conveyor does not pass through the natural frequency of the balancer system to reach operating frequency. Actual resonance between conveyor and balancer is never reached in order to prevent erratic and excessive motion of the balancer system which will occur at resonance. The balancer weight 79 receives the vibrations of the conveyor trough through the connection of the bottom of the trough's supporting legs to the base frame 76. In the operating condition, this vibration then excites the balancer weight so it operates near its natural frequency, but in an out-of-phase relationship to the forced vibration of the trough to provide the kinetic forces opposing the unbalanced kinetic forces of the oscillating conveyor trough. The result is the substantial elimination of any transfer of vibratory forces into the foundation or supporting structure.

As might be expected, it is not only practical but highly advantageous to combine an oscillating conveyor trough suspension system (FIGS. 4-7) and an oscillating conveyor balancer suspension system (FIGS. 8-9) into the same conveyor, so that the advantages of both suspension systems may be utilized at the same time. As shown in FIGS. 10-12 both suspension systems may be incorporated in approximately the same physical outline of the conveyor by longitudinally spacing and alternating each type of roller band mechanism and also by positioning the balancer weight members over and outside of the parallel members of the trough suspension system so each suspension system is able to properly operate independently. Such a conveyor will now be described.

In the oscillating conveyor 120 a U-shaped trough 122 is supported on a plurality of spaced pairs of roller band mechanism 124, as particularly shown in FIG. 12, and a balancer weight 126 is supported on a plurality of spaced pairs of roller band mechanisms 128, as particularly shown in FIG. 11. The trough 122 is oscillated by a positive drive, not shown, but similar to that previously described and shown in FIG. 7. A base frame 130 is provided in the form of a continuous elongated structural beam. A plurality of resilient isolating pads 132 are longitudinally spaced and attached to the bottom of the base frame 130 which forms a vibration isolator or resilient support between the conveyor and the foundation or structure on which the conveyor is mounted. An elongated bent plate cover member 136 is attached to the upstanding flange of the trough, passes over a yoke or connection member 140 and extends downwardly beyond the yoke member to overlap the outer side of the base frame 130. This cover moves with the trough 122, is not connected to the stationary base frame 130 and forms a safety guard enclosing the roller band mechanisms.

As shown in FIG. 12, the trough suspension system has a plurality of pairs of roller band mechanisms 124 longitudinally spaced along the conveyor. One roller band mechanism of each pair is installed about a vertical plane on each transverse side of the conveyor trough parallel to and adjacent one upstanding flange of the trough 122. Each of the roller band mechanisms 124 is a modular assembly which comprises an inclined plane member 138, the yoke or connection member 140, a pair of flexible bands 142, a pair of equal diameter rollers 144, a pair of vertically spaced parallel members 146, a pair of bent plate support members 147 for the parallel members, and a pair of reactor springs 148. At the location of each roller band mechanism 124, the trough 122 is transversely reinforced by a U-shaped bent plate 150 conforming to and rigidly attached to the trough as by welding. The inclined plane member 138 includes a central straight inclined plane portion having two opposite parallel surfaces joined at each end by curved portions and then followed by straight tangent end portions which are generally formed at right angles to the axis of the reactor springs as previously described. The inclined plane member may also be constructed in the form of a pair of spaced parallel planes as shown in FIGS. 1A and 1B and previously described. The yoke or connection member 140 includes a pair of vertical legs 156 joined at the top by a horizontal flange 157. The inclined plane member 138 is positioned transversely to the length of the conveyor and is rigidly connected as by welding at its transverse ends to the vertical legs 156 of the yoke member. One vertical leg 156 of each yoke member is rigidly secured as by welding to the reinforcing plate 150 and thereby to the trough 122. Since the yoke member 140 supports the inclined plane member 138 and the yoke member is secured to the trough, the inclined plane member 138 is connected to and moves with the trough 122.

The pair of parallel members 146 are usually elongated continuous beams, such as channels, interconnecting several or all of the roller band mechanisms 124. The parallel members are vertically separated and supported by the bent plate support members 147 so that one of the pair of parallel members is positioned above and the other parallel member is positioned below the inclined plane member 138. The vertical spacing of these parallel members is a function of the angle of inclination of the inclined plane portion, the diameter of the rollers, and the stroke of the drive unit. The bent plate support members 147 are attached at each end to one of the parallel members 146 by bolts and nuts as previously described. The first and a second reactor springs of the pair of reactor springs 148 are positioned between the support members 147 and the end portions 154 and 155 respectively of the inclined plane member 138 to hold the conveyor trough 122 in equilibrium when at rest, approximately at mid-position of its movement.

The reactor springs are secured by bolts and nuts as previously described. The lower parallel member of the pair of parallel members 146 is rigidly attached, as by welding, to the base frame 130. The pair of parallel members 146 by being connected to the base frame 130 is thus held stationary.

One end of the upper one of the pair of flexible bands 142 is secured under the first of the reactor springs 148 on the end portion of the inclined plane member 138 where it is held by a bolt and a nut also retaining the spring. The upper band is wrapped around the upper surface of the curved portion of inclined plane member 138, partially around one of the pair of rollers 144 and then along the inside surface of the upper one of the parallel members 146. The other end of the upper band is then tensioned as it is secured between the upper parallel member and the upper end of the first one of the pair of bent plate support members 147 by a bolt and a nut. One end of the lower one of flexible bands 142 is secured under the second reactor spring 148 on the end portion of the inclined plane member 138 where it is held by a bolt and a nut also retaining the second reactor spring as previously described. The lower flexible band is wrapped around the lower surface of the curved portion, partially around the lower one of the pair of rollers 144 and then along the inside surface of the lower one of the pair of parallel members 146. The other end of the lower band is then tensioned as it is secured between the lower one of the parallel members 146 and the lower end of the second support member 147 by a bolt and a nut. The pair of rollers 144 is thus confined within loops of the pair of flexible bands 142, but the rollers are free to roll on the bands over the straight inclined plane portion of the movable inclined plane member. While the pair of parallel members is held stationary, the rollers 144 can roll on these parallel members and through their rolling contact within the loops of the flexible bands on the inclined plane portion wind up or unwind the bands to cause the inclined plane member 138 to oscillate. Since the bands are attached at one end to this inclined plane member, it is free to move within a particular diagonal path dependent upon the inclination of the inclined plane portion, the diameter of the rollers 144 and the vertical spacing of the parallel members 146. Since the trough 122 is connected to this inclined plane member 138, the trough will also oscillate along the same diagonal path as the inclined plane member and have a stroke equal to the total stroke of the positive drive connected to the trough.

As shown in FIG. 11, the balancer weight 126 is supported on a plurality of pairs of roller band mechanisms 128 longitudinally spaced along the conveyor in a staggered or alternating pattern with the trough suspension roller band mechanisms 124 previously described. One roller band mechanism of each pair is installed about a vertical plane on each transverse side of the conveyor trough parallel to the adjacent upstanding flange of the trough. The vertical plane forming the centerline of the roller band mechanisms 124 is coincident with the vertical plane forming the centerline of the roller band mechanisms 128 so the two types of roller band mechanisms operate in direct alignment with each other, but staggered longitudinally. At each location of a pair of roller band mechanisms 128, the trough is also reinforced with the trough reinforcing plate 150 as described under the roller band mechanism 124 for the trough suspension system.

Each of the roller band mechanisms 128 for the balancer suspension system is a modular assembly which comprises an inclined plane member 164, a yoke or connection member 166, a pair of flexible bands 168, a pair of equal diameter rollers 170, the pair of vertically spaced parallel members 146, a pair of bent plate support members 174 for the parallel members and a pair of reactor springs 176. The inclined plane member 164 includes a central straight inclined plane portion having two opposite parallel surfaces, joined at each end by curved portions and then followed by straight tangent end portions which are generally formed at right angles to the axis of the reactor springs as previously described. The inclined plane member 164 may also be constructed in the form of a pair of spaced parallel planes as shown in FIGS. 1A and 1B and also as previously described. The yoke member 166 includes a pair of vertical legs 184 joined at the top by a horizontal flange. The inclined plane member 164 is positioned transversely to the length of the conveyor and is rigidly connected as by welding at its transverse ends to the vertical legs 184 of the yoke or connection member. The balancer weight 126 comprises an elongated structural member 187 such as a channel, plus additional plate members 188. The elongated structural member 187 is generally a continuous member interconnecting several or all of the roller band mechanisms 128. It is rigidly connected to each yoke member 166 and is positioned above and in a surrounding relationship to the upper one of the pair of parallel members 146 so as to clear and to operate without interference with the parallel members. The additional plate members 188 are generally short members attached to the continuous member 187 in between the yoke members 166 to provide additional balancing weight where necessary to improve the balancing condition. The continuous member 187 and the additional plates 188 have a transverse width less than the inside width of the yoke or connection member 140 of the trough suspension system so as to operate without interference inside of yoke 140 and the enclosing cover 136 as shown in FIG. 12. It is thus apparent that the transverse width of the inclined plane member 164 is shorter than the transverse width of the inclined plane member 138 of the trough suspension system to obtain the necessary operating clearances.

The pair of parallel members 146 are vertically separated and supported by the bent plate support members 174 so that one of the pair of parallel members is positioned above and the other parallel member is positioned below the inclined plane member 164. The vertical spacing of these parallel members is a function of the angle of inclination of the inclined plane portion 178 and the diameter of the rollers 170. The bent plate support members 174 are attached at each end to one of the parallel members 146 by bolts and nuts as previously described. When the parallel members 146 for the trough suspension system are made continuous members as shown in FIG. 10, a separate pair of parallel members for the balancer suspension system is not required and the pair of parallel members 146 is utilized for both the trough and the balancer suspension systems. In this case, the bent plate support members 174 are not required either and the bent plate support members 147 are utilized for both suspension systems also. The lower one of the pair of parallel members 146 is rigidly attached as by welding, to the base frame 130. Thus, the lower one of the pair of parallel members 146 is held stationary but its connection to the base frame 130 which is continuous under the entire conveyor.

A first and second reactor spring of the pair of reactor springs 176 are positioned between the support members 174 and the end portions of the inclined plane member 164 to hold the balancer weight 126 in equilibrium, when at rest, approximately at mid position of its movement. The reactor springs 176 are secured by bolts and nuts as previously described.

One end of the upper one of the pair of flexible bands 168 is secured under the first of the reactor springs 176 on the end portion of the inclined plane member 164 where it is held by a bolt and a nut also retaining the spring. The upper band is wrapped around the upper surface of the curved portion of the inclined plane member 164, partially around the upper one of the pair of rollers 170 and then along the inside surface of the upper one of the parallel members 146. The other end of the upper band is then tensioned as it is secured between the upper parallel member and the upper end of the first one of the pair of support members 174 by a bolt and a nut as previously described. One end of the lower one of the pair of flexible bands 168 is secured under the second reactor spring 176 on the end portion of the inclined plane member 164 where it is held by a bolt and a nut also retaining the second reactor spring. The lower flexible band is wrapped around the lower surface of the curved portion, partially around the lower one of the pair of rollers 170 and then along the inside surface of the lower one of the parallel members 146. The other end of the lower band is then tensioned as it is secured between the lower one of parallel members 146 and the lower end of the second support member 174 by a bolt and a nut as previously described. The pair of rollers 170 is thus confined within loops of the pair of flexible bands 168, but the rollers are free to roll upon the bands on the straight inclined plane portion of the movable inclined plane member 164. While the pair of parallel members 146 are held stationary, the rollers 170 can roll on these parallel members and through their rolling contact within the loops of the flexible bands on the inclined plane portion wind up or unwind the bands to cause the inclined plane member 164 to oscillate. Since the bands are attached at one end to this inclined plane member, the inclined plane member is free to move within a particular diagonal path dependent upon the inclination of the inclined plane portion, the diameter of the rollers 170 and the vertical spacing of the parallel members 146 as previously discussed. Since the balancer weight 126 is connected to this inclined plane member 164, the balancer weight will also oscillate along the same diagonal path as the inclined plane member.

Due to known physical laws, the kinetic forces of the oscillating conveyor operating at its driven speed (i.e., its forced frequency) will be balanced when the product of the moving weight of the trough assembly times its stroke equals the product of the movable weight of the balancer times its stroke. In the presently disclosed roller band suspension system for the self-excited balancer, the stroke of the balancer is not fixed and thus operates at a stroke determined by the weight of the balancer selected. Thus, by allowing sufficient clearance for the movement of the rollers along the straight inclined plane portion before the rollers bottom in the curved portions of the inclined plane member, the stroke of the balancer may be made substantially larger than the stroke of the trough. The weight of the balancer will then be less than the weight of the trough which has a distinct economical advantage in the manufacture of the balancer since less material will be required. The smaller balancer may also require less physical space permitting a smaller cross-sectional outline for the conveyor and/or a lower profile. With a given balancer weight, the effect of the additional variable weight of material being conveyed by the trough will also be automatically compensated for by a corresponding change in stroke when sufficient clearance is also provided for this increase in stroke. This permits more complete balancing under the usual changeable operating conditions having a variable material load than is generally practical with conventional balancing systems having fixed balancing weights and fixed strokes. It is to be noted that the natural frequency of the reactor springs for the balancer suspension system are selected to be near and slightly above, but not at, the operating frequency of the conveyor so as to avoid resonance conditions.

The roller band mechanisms disclosed herein for the trough suspension and balancer suspension systems normally use identical components, such as rollers, flexible bands and inclined plane members. These components may be made in quantity and thus reduce their manufacturing costs and increase their availability by permitting stocking of these common parts with a minimum inventory of different parts. The same components may also be used in various size conveyors merely by increasing or decreasing the number of roller band assemblies used through suitable selection of their longitudinal spacing. There is very little friction or hysteresis loss in these roller band mechanisms when operating. The rolling action of the rollers within the tensioned bands operates without slip so requires no lubrication and as no clearance exists between the rollers and the tensioned bands, noise, wear, service adjustments and maintenance problems usually associated with vibrating equipment are greatly reduced or eliminated. These roller band mechanisms also produce fewer and less complex stresses at the points of support or connection to other members. Further, the compactness of the roller band mechanisms permits these assemblies to be easily enclosed for safety, cleanliness and appearance. Thus, these novel roller band mechanisms and their use as trough suspension systems and balancer suspension systems provide a substantial improvement in the art of oscillating conveyors.

Although the best mode contemplated for carrying out the present invention has been herein shown and described, it will be apparent that modification and variation may be made without departing from what is regarded to be the subject matter of the invention.

What is claimed is:

1. A mechanism for vibrating a load comprising:
   a. a stationary member;
   b. a movable member to receive the load;
   c. an inclined plane member connected to one of said stationary and movable members, said inclined plane member having two opposite inclined surfaces;
   d. a first band connected between said stationary member and said inclined plane member, said first band defining a first loop on one surface of said inclined plane member;
   e. a second band connected between said stationary member and said inclined plane member, said second band defining a second loop on the other surface of said inclined plane member;
   f. a pair of rollers, each roller being retained within one of the loops in the bands, a portion of each band while wrapped around the roller, making contact with one of said members and with one of said opposite inclined surfaces to guide the movable member along an inclined path with respect to the stationary member; and
   g. means to oscillate said movable member.

2. The mechanism of claim 1 wherein said movable member has two spaced parallel surfaces, said inclined plane member is connected to said stationary member and is positioned between the parallel surfaces of said movable member, one end of the first band is connected to one of the parallel surfaces of said movable member and the other end of the first band is connected to said inclined plane member, and one end of the second band is connected to the other parallel surface of said movable member and the other end of the second band is connected to said inclined plane member.

3. The mechanism of claim 1 wherein said stationary member has two spaced parallel surfaces, said inclined plane member is connected to said movable member and is positioned between the parallel surfaces of said stationary member, one end of the first band is connected to one of the parallel surfaces of said stationary member and the other end of the first band is connected to said inclined plane member, and one end of the second band is connected to the other parallel surface of said stationary member and the other end of the second band is connected to said inclined plane member.

4. The mechanism of claim 2 further comprising resilient means connected between said movable member and said inclined plane member to provide the freedom for said movable member to move with respect to said stationary inclined plane member.

5. The mechanism of claim 2 wherein the two opposite inclined surfaces of said inclined plane member are substantially spaced and parallel, and wherein the spacing between the two parallel surfaces of said movable member exceeds the sum of the two diameters of said pair of rollers.

6. The mechanism of claim 3 further comprising resilient means connected between said stationary member and said movable inclined plane member to provide the freedom for said movable inclined plane member to move with respect to said stationary member.

7. The mechanism of claim 3 wherein the two opposite inclined surfaces of said inclined plane member are substantially spaced and are parallel, and wherein the spacing between the two parallel surfaces of said stationary member exceeds the sum of the two diameters of said pair of rollers.

8. A roller band mechanism for producing motion in one of its members along a resultant path inclined differently from any of the members which comprises:
   a. a pair of parallel members including at least a pair of longitudinally spaced supports connecting and vertically spacing the parallel members;
   b. an inclined plane member positioned between said pair of parallel members, said inclined plane member having at least one straight inclined plane portion with two opposite parallel surfaces;
   c. a pair of flexible bands, one end of a first band of said pair of bands being secured to one of said pair of parallel members and the other end of said first band being secured to one end of said inclined plane member with a loop being formed in the first band between its ends, one end of a second band of said pair of bands being secured to the other one of said pair of parallel members and the other end of said second band being secured to the other end of said inclined plane member with a loop being formed in the second band between its ends;

d. a pair of rollers, a first one of said pair of rollers retained inside of the loop of the first band, a portion of said first band, while wrapped around said first roller, making contact with one of said parallel members and with one surface of the straight inclined portion of said inclined plane member, a second one of said pair of rollers retained inside of the loop of the second band, a portion of said second band, while wrapped around said second roller, making contact with the other one of said parallel members and with the other surface of the straight inclined plane portion of said inclined plane member;

e. resilient means connected between said support members and said inclined plane member; and f. a stationary base frame to which said inclined plane member is attached, whereby when a vibratory force is transmitted to said base frame, the pair of rollers within the bands roll up and down the straight inclined plane portion of said inclined plane member and since one end of the bands is attached to the stationary inclined plane member, the movement of the ends of the bands attached to the pair of parallel members cause the parallel members to move in a resultant path inclined at an angle to the base frame less than the angle of inclination of the straight inclined plane portion to the base frame.

9. The roller band mechanism of claim 8 wherein said inclined plane member has an S-shaped configuration with two curved portions tangent to the ends of the straight inclined plane portion and a straight end portion beyond each of the curved portions, said straight end portions providing means for connecting the ends of the bands to the inclined plane member and providing a seat for said resilient means on said inclined plane member.

10. The roller band mechanism of claim 8 wherein said resilient means is a pair of coil springs, said springs providing the freedom for said pair of parallel members to move with respect to said fixed inclined plane member.

11. The roller band mechanism of claim 8 wherein the pair of parallel members move in a resultant path inclined at an angle to the base frame of one half of the angle of inclination of the straight inclined plane portion to the base frame.

12. The roller band mechanism of claim 8 wherein said inclined plane member comprises two formed plates joined to each other to form a modified diamond shaped box with opposite sides being paralllel, each formed plate including two straight leg portions connected by a curved portion, one pair of opposite leg portions forming spaced parallel inclined plane portions and the other pair of opposite leg portions providing seats for the resilient means and connection means for one end of each of said pair of flexible bands, and wherein the spacing between said pair of parallel members exceeds the sum of the two diameters of said pair of rollers.

13. The roller band mechanism of claim 8 wherein said inclined plane member comprises a plate formed into a hexagonally shaped box with opposite sides being parallel and the corners between adjacent sides being curved, one pair of opposite sides forming parallelly spaced inclined plane portions and another pair of opposite sides providing seats for the resilient means and connection means for one end of each of said pair of flexible bands, and wherein the spacing between said pair of parallel members exceeds the sum of the two diameters of said pair of rollers.

14. A roller band mechanism, for producing motion in one of its members along a resultant path inclined differently from any of the members, which comprises:

a. a pair of stationary parallel members including at least a pair of longitudinally spaced support members connecting and vertically spacing the parallel members;

b. a movable inclined plane member positioned between said pair of parallel members and between the support members for said parallel members, said inclined plane member having at least one straight inclined plane portion with two opposite parallel surfaces;

c. a pair of flexible bands, one end of a first band of the pair of bands being secured to one of the parallel members and the other end of the first band being connected to one end of said inclined plane member with a loop being formed in the first band between its ends, one end of a second band being secured to the other one of the parallel members and the other end of the second band being connected to the other end of said inclined plane member with a loop being formed in the second band between its ends;

d. a pair of rollers, each roller being retained within one of the loops in the bands, a portion of each band, while wrapped around the roller, making contact with one of said parallel members and with one surface of the straight inclined plane portion of said inclined plane member; and e. resilient means connected between said inclined plane member and the supports for said pair of parallel members, whereby when a reciprocating motion is transmitted to said inclined plane member, the pair of rollers will roll within the loops of said flexible bands and since one end of each of the flexible bands is restrained by being secured to the stationary parallel members while the other end of the bands is attached to the inclined plane member, said inclined plane member moves in a resultant direction inclined at an angle to the parallel members less than the angle of inclination of the straight inclined plane portion to the parallel members.

15. The roller band mechanism of claim 14 wherein said inclined plane member has an S-shaped configuration with two curved portions tangent to the ends of the straight inclined plane portion and a straight end portion beyond each of the curved portions, said straight end portions providing means for connecting the ends of the bands to the inclined plane member and providing a seat for said resilient means on said inclined plane member.

16. The roller band mechanism of claim 14 wherein said resilient means is a pair of coil springs, said springs providing the freedom for said inclined plane member to move with respect to the stationary pair of parallel members.

17. The roller band mechanism of claim 14 wherein said inclined plane member comprises two formed plates joined to each other to form a modified diamond shaped box with opposite sides being parallel, each formed plate including two straight leg portions connected by a curved portions, one pair of opposite leg portions forming spaced parallel inclined plane portions and the other pair of opposite leg portions providing seats for the resilient means and connection means for one end of each of said pair of flexible bands and wherein the vertical spacing between said pair of stationary parallel members exceeds the sum of the two diameters of said pair of rollers.

18. The roller band mechanism of claim 14 wherein said inclined plane member comprises a plate formed into a hexagonally shaped box with opposite sides being parallel and the corners between adjacent sides being curved, one pair of opposite sides forming parallelly spaced inclined plane portions and another pair of opposite sides providing seats for the resilient means and connection means for one end of each of said pair of flexible bands and wherein the vertical spacing between said pair of stationary parallel members exceeds the sum of the two diameters of said pair of rollers.

19. The roller band mechanism of claim 14 wherein said inclined plane member moves in a resultant path inclined at an angle to the pair of parallel members of one half of the angle of inclination of the straight inclined plane portion to the pair of parallel members.

20. In an oscillating conveyor having a movable trough for conveying material, a base frame and drive means connected to the trough for reciprocating the trough, a roller band suspension system for supporting the movable trough which comprises: a plurality of roller band mechanisms longitudinally spaced along the conveyor, each roller band mechanism comprising a stationary member having two spaced parallel surfaces connected to the base frame of the conveyor; an inclined plane member connected to the movable trough of the conveyor, said inclined plane member having two opposite inclined parallel surfaces, said inclined plane member being positioned between the two spaced parallel surfaces of said stationary member; a first band connected between one parallel surface of said stationary member and said inclined plane member, said first band defining a first loop on one surface of said inclined plane member; a second band connected between the other parallel surface of said stationary member and said inclined plane member, said second band defining a second loop on the other surface of said inclined plane member; a pair of rollers, each roller being retained within one of the loops in the bands, a portion of each band while wrapped around the roller making contact with one of the spaced parallel surfaces of said stationary member and with one of the two opposite inclined surfaces of said inclined plane member to guide the inclined plane and the movable trough to which it is connected along a resultant path inclined with respect to the stationary member.

21. The roller band suspension system of claim 20 wherein the interaction of the rollers within the bands making contact with both the fixed parallel surfaces of said stationary member and the movable inclined plane member controls the direction of movement of said inclined plane member and thereby the trough to an inclined path having an angle as measured from the plane of one of the parallel members equal to one half of the angle of inclination of the angle of inclination of the straight inclined plane portion of said inclined plane member as measured from the plane of one of the parallel members.

22. The roller band suspension system of claim 20 wherein said inclined plane member has an S-shaped configuration with two curved portions tangent to the ends of the straight inclined plane portion and a straight end portion beyond each of the curved portions.

23. The roller band suspension system of claim 20 wherein each roller band mechanism further comprises a pair of coil springs, said springs holding the inclined plane member, and thereby the trough, in equilibrium, at rest, approximately midway between the parallel surfaces of said stationary member.

24. The roller band suspension system of claim 20 in which said inclined plane member is connected to the trough by a U-shaped yoke member having two vertical legs connected at their top by a horizontal flange, the transverse ends of said inclined plane member being rigidly attached to both vertical legs and the yoke member being rigidly attached to the conveyor trough to thereby connect the inclined plane member to the conveyor trough.

25. In an oscillating conveyor having a movable trough, a plurality of leg assemblies supporting the trough, a base frame on which the leg assemblies are mounted, a conveyor balancer, and drive means connected to the trough for oscillating the trough, a roller band suspension system for the conveyor balancer which comprises: a plurality of roller band mechanisms longitudinally spaced along the length of the conveyor, each roller band mechanism comprising: a movable member having two spaced parallel surfaces, said movable member providing the principal balancing mass for the conveyor balancer; a stationary inclined plane member attached to the base frame and having two opposite inclined parallel surfaces, said inclined plane member being positioned between the two spaced parallel surfaces of said movable member; a first band connected between one parallel surface of said movable member and said inclined plane member, said first band defining a first loop on one surface of said inclined plane member; a second band connected between the other parallel surface of said movable member, said second band defining a second loop on the other surface of said inclined plane member; a pair of rollers, each roller being retained within one of the loops in the bands, a portion of each band while wrapped around the roller making contact with one of the spaced parallel surfaces of said movable member and with one of the two opposite inclined surfaces of said inclined plane member to guide said movable member along a resultant path inclined at a smaller angle than the angle of inclination of the two inclined surfaces of the stationary inclined plane member, said movable member having an out-of-phase relationship to the motion of the oscillating trough when excited by the vibratory forces of the oscillating trough as transmitted through the conveyor base frame, the movement of the balancing mass of said movable member providing the kinetic forces opposing the unbalanced kinetic forces of the oscillating trough to substantially eliminate the transfer of vibratory forces into the supporting structure for the conveyor.

26. The roller band suspension system for the oscillating conveyor balancer of claim 25 further comprising a plurality of plates removably attached to said movable member to provide additional balancing mass for the conveyor balancer and to adjust the balancing mass to better suit the operating conditions.

27. The roller band suspension system for the oscillating balancer of claim 25 wherein the two opposite inclined parallel surfaces of said inclined plane member have a length substantially greater than the length of the stroke of the conveyor trough when oscillating, this length of the inclined parallel surfaces permitting the resulting motion of said movable member to substantially exceed the stroke of the oscillating trough and thereby require less balancing mass than the mass of the oscillating trough to achieve proper balancing and to substantially eliminate the transfer of vibratory forces into the foundation or supporting structure on which the conveyor is mounted.

28. The roller band suspension system for the oscillating conveyor balancer of claim 25 wherein each roller band mechanism further comprises a pair of springs connected between said inclined plane member and said movable member to resiliently support said movable member, said springs being selected to have a natural frequency to operate near but slightly above the operating frequency of the conveyor trough to avoid a resonance condition during starting of the conveyor and thus to prevent erratic and excessive motion of the balancing mass of the conveyor balancer.

29. In an oscillating conveyor having a movable trough, drive means connected to the trough for oscillating the trough, a conveyor balancer, and at least one base frame extending longitudinally of the conveyor, a roller band suspension system independently supporting both the movable trough and the conveyor balancer which comprises:

a. an elongated stationary member extending substantially the length of the conveyor and having two spaced parallel surfaces, said stationary member positioned above and connected to the conveyor base frame;

b. a plurality of trough supporting roller band mechanisms longitudinally spaced along the length of the conveyor, each mechanism being located in vertical alignment with said stationary member and between the two spaced parallel surfaces of said stationary member, each trough supporting roller band mechanism comprising: a first inclined plane member connected to the conveyor trough, said first inclined plane member having a straight inclined plane portion with two opposite parallel surfaces; a first band connected between one parallel surface of said stationary member and said first inclined plane member, said first band defining a first loop on one surface of said first inclined plane member; a second band connected between the other parallel surface of said stationary member, said second band defining a second loop on the other surface of said first inclined plane member; a first pair of rollers, each roller being retained within one of the loops in the first and second bands, a portion of each band while wrapped around the roller making contact with one of the spaced parallel surfaces of said stationary member and with one of the two opposite inclined surfaces of said first inclined plane member to guide the movable inclined plane member and thereby the movable trough to which it is connected along a resultant path inclined with respect to the parallel surfaces of said stationary member; and c. a plurality of balancer supporting roller band mechanisms longitudinally spaced along the length of the conveyor in an alternating relationship with said trough supporting mechanisms, each balancer supporting mechanism being located in vertical alignment with said stationary member and between the two spaced parallel surfaces of said stationary member, each balancer supporting mechanism comprising: a second inclined plane member having a straight inclined plane portion with two opposite parallel surfaces; an elongated balancing member providing the principal mass of the conveyor balancer, said balancing member positioned above the upper spaced parallel surface of said stationary member, but clear of the connection between said first inclined plane member and the conveyor trough, to move without interferring with either the connection for the first inclined plane member or of said stationary member; a third band connected between one parallel surface of said stationary member and said second inclined plane member, said third band defining a third loop on one surface of said second inclined plane member; a fourth band connected between the other parallel surface of said stationary member and said second inclined plane member, said fourth band defining a fourth loop on the other surface of said second inclined plane member; a second pair of rollers, each roller being retained within one of the loops in the third and fourth bands, a portion of each band while wrapped around the roller making contact with one of the spaced parallel surfaces of said stationary member and with one of the two opposite inclined surfaces of said second inclined plane member to guide the movable second inclined plane member and said balancing member to which it is connected along a resultant path inclined with respect to the parallel surfaces of said stationary member in an out-of-phase relationship to the oscillating trough when excited by the vibratory forces of the oscillating trough as transmitted through said stationary member, the out-of-phase movement of said balancing member providing the kinetic forces opposing the unbalanced kinetic forces of the oscillating trough to substantially eliminate any transfer of vibratory forces from the conveyor into the supporting structure for the conveyor.

30. The roller band suspension system of claim 29 further comprising a plurality of plates removably attached to said balancing member to provide additional weight for the balancing mass of the conveyor and to adjust the balancing mass to better suit the operating conditions.

31. The roller band suspension system of claim 29 wherein the straight inclined plane portion of said second inclined plane member has a length substantially greater than the length of the stroke of the conveyor trough when oscillating, said straight inclined plane portion of said second inclined plane member permitting the resulting movement of said balancing member to substantially exceed the stroke of the oscillating trough and thereby require less balancing mass than the mass of the oscillating trough to achieve proper balancing.

32. The roller band suspension system of claim 29 wherein each trough supporting mechanism further comprises a first pair of springs connected between said stationary member and said first inclined plane member to hold the first inclined plane member in equilibrium when at rest approximately midway between the parallel surfaces of said stationary member.

33. The roller band suspension system of claim 29 wherein each balancer supporting mechanism further comprises a second pair of springs connected between said stationary member and said second inclined plane member to hold the second inclined plane member in equilibrium when at rest approximately midway between the parallel surfaces of said stationary member, said second pair of springs selected to have a natural frequency to operate near but slightly above the operating frequency of the conveyor trough to avoid a resonance condition during starting of the conveyor and thus to prevent erratic and excessive motion of the balancer.

34. The roller band suspension system of claim 29 wherein the conveyor trough moves in a resultant path inclined at an angle to the longitudinal plane of the parallel surfaces of said stationary member equal to one half of the angle of inclination of the straight inclined portion of said first inclined plane member to the longitudinal plane of the parallel surfaces and wherein said balancing member moves in a resultant path inclined at an angle to the longitudinal plane of the parallel surfaces of said stationary member equal to one half of the angle of inclination of the straight inclined portion of said second inclined plane member to the longitudinal plane of the parallel surfaces.

* * * * *

UNITED STATES PATENT OFFICE
CERTIFICATE OF CORRECTION

PATENT NO. : 3,865,231
DATED : February 11, 1975
INVENTOR(S) : RALPH CHARLES OUSKA It is certified that error appears in the above-identified patent and that said Letters Patent are hereby corrected as shown below:

Col. 3, line 62, after "base" delete "along" and insert -- frame --

Col. 6, line 16, change "loweor" to -- lower --.

Col. 7, line 37, change "23'" to -- 23" --.

Col. 11, line 48, change hand to -- band --.

Col. 15, line 64, change "but" to -- by --.

Col. 23, line 10, after "lating" insert -- conveyor --.

Signed and Sealed this twenty-seventh Day of April 1976

[SEAL]

Attest:

RUTH C. MASON
Attesting Officer

C. MARSHALL DANN
Commissioner of Patents and Trademarks